United States Patent [19]

Konig et al.

[11] 4,041,245
[45] Aug. 9, 1977

[54] SWITCHING ARRANGEMENT FOR TELECOMMUNICATION SWITCHING SYSTEMS

[75] Inventors: Justus König, Munich; Josef Röhrig, Oberhaching, both of Germany

[73] Assignee: Siemens Aktiengesellschaft, Munich, Germany

[21] Appl. No.: 668,954

[22] Filed: Mar. 22, 1976

[30] Foreign Application Priority Data

Mar. 21, 1975 Germany .......................... 2512633

[51] Int. Cl.² ............................................. H04Q 3/00
[52] U.S. Cl. ............................................. 179/18 AB
[58] Field of Search ......... 179/18 AB, 16 F, 175.2 R, 179/175.2 C, 175.21

[56] References Cited

U.S. PATENT DOCUMENTS 3,824,348  7/1974  Merriam ........................ 179/18 AB

FOREIGN PATENT DOCUMENTS 1,173,538  7/1964  Germany ....................... 179/18 AB
2,013,117  9/1971  Germany ....................... 179/18 AB Primary Examiner—Thomas A. Robinson
Attorney, Agent, or Firm—Gerald L. Lett

[57] ABSTRACT

A telecommunication switching arrangement is described wherein each seizable switching component, i.e., a component in an idle condition, is so marked by application of an idle potential to a test point by means of a seizing circuit in that switching component. The busy condition is indicated by the absence of the aforementioned potential. The condition of the switching component is sensed by a test switching device having an internal impedance corresponding to that of a preceding switching component. The latter device accomplishes its task by completing a test and seizure circuit including the aforementioned test point. If a switching component being tested is already seized by another switching component, it will have been blocked by a blocking circuit in the other switching component. Such blocking is brought about by applying a potential differing from the idle potential from the blocking circuit via an auxiliary test switching means in the other switching component, which has an internal impedance identical to the test switching means. For seizure, the seizing circuit in each switching component is fed from a constant current generator proportioned in accordance with the number of switching components testing that switching component. The foregoing proportion is the inverse of the number of switching components testing in parallel.

1 Claim, 1 Drawing Figure

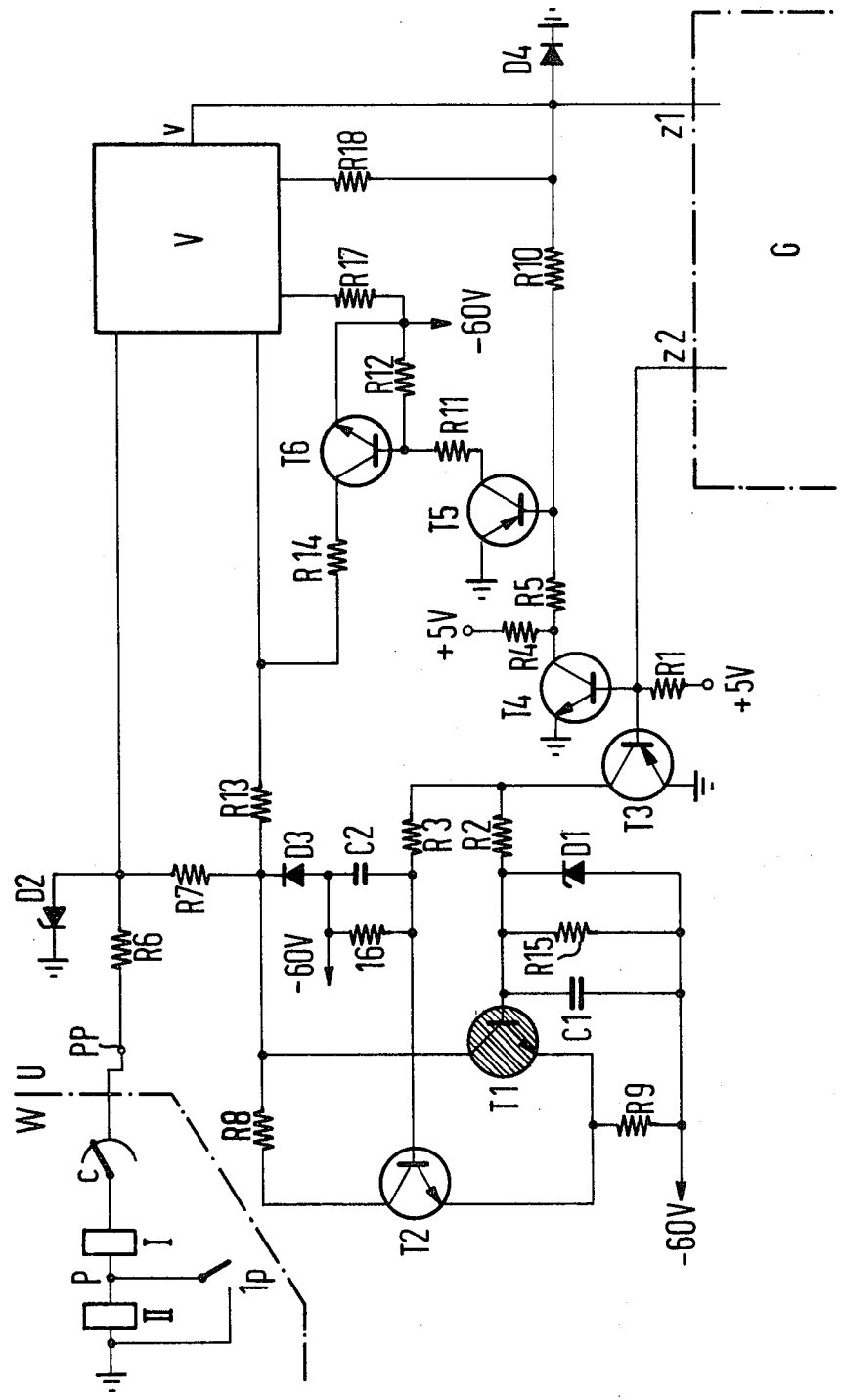

SWITCHING ARRANGEMENT FOR TELECOMMUNICATION SWITCHING SYSTEMS

BACKGROUND OF THE INVENTION

The invention relates to a switching arrangement for telecommunication systems, more particularly telephone switching systems.

There are known switching arrangements wherein in through-switching components ready for seizure the idle condition is marked by an idle potential applied to a check point over resistors of a seizing circuit of the switching component in question. The busy condition is marked by the absence of that potential. The busy/idle condition (free or blocked) of a switching component may be ascertained by using a switching device having an internal impedance corresponding to that of a preceding switching component (e.g., a selector) testing for seizure over a test and seizing circuit completed by connecting the test switching means to the check point. Blocking of a seized switching component due to seizure by the preceding switching component is brought about by applying an opposed potential differing from the idle potential over auxiliary test switching means in the test and seizing circuits provided in the preceding switching component.

A switching arrangement of the aforementioned type has been disclosed in the prior art by West German Pat. 1,173,538. It is a commonly known technique for switched telephone systems to ascertain the busy/idle condition, i.e., free or blocked seizure wires of selectors, repeaters and similar equipments using test relays which initially test to comparatively high impedance. If the equipment being tested is in the idle condition, it is caused to be seized and blocked to a low impedance. In the idle condition the equipment being tested offers a potential (e.g., negative potential) identifying the condition over its seizing circuit at a check point allocated thereto.

A testing selector works from its test circuit with an inverse potential, e.g., a positive potential (ground potential). If a selector finds an idle output, that is, if a test circuit of a testing selector is connected to a seizing circuit of a following free equipment whose check point carries the potential identifying the idle condition, the test relay of the selector responds, stops it and connects the inverse potential with a relatively low impedance to the check point of the seizing circuit of the equipment so seized. Therefore, the potential identifying the idle condition is eliminated. The test relay of the selector is held over the circuit so completed. Other selectors testing thereafter almost meet with the inverse potential, to be precise, a partial potential across the seizing circuit and thus recognize the equipment concerned as seized.

Thus, there is a divided circuit when a seized equipment is being tested. The common part of the divided circuit consists of the seizing circuit of the seized equipment. One of the two branches of the divided circuit comprises a blocking circuit of the selector that has previously seized the equipment being tested. In this branch is located a low-resistance coil of the test relay of the selector. The other of the two branches is the test circuit of the other selector which finds the equipment being tested blocked (seized). The low-impedance and the high-impedance coils of the test relay of the second selector are connected in series in this branch. The junction point is the check point of the seizing circuit of the equipment being tested. Because the blocking circuit of the first selector is substantially more low-impedance than the test circuit of the second selector, one gets a branching-off of the current at the common check point. The splitting of the total current in the seizing circuit of the equipment being tested into two partial currents is so devised that the predominant part of the total current energizes the blocking circuit and the test relay of the first selector. The partial current in the test circuit of the second selector and in its two test relay coils is so weak that the test relay cannot respond. Thus it is ensured that the test relay of the first selector continues to respond and the test relay of the second selector cannot respond.

More difficult, however, is the special case of the parallel testing of two selectors. In this case, both test circuits of two independently testing selectors are connected randomly and simultaneously to the check point of a subsequent equipment. Assuming that the test relay of both selectors have identical resistance values, which is the rule in many cases, a current division occurs in the ratio 1 to 1. That means that half the current in the seizing circuit of the subsequent equipment energizes the coils of the test relays of both selectors. In this case both test relays must not respond. This condition is difficult to comply with. Therefore, the low-impedance blocking by the test relay that first operates its contacts shall prevent the other test relay from responding also.

To improve the conditions during the parallel testing of two selectors with a view to preventing double testing it is common knowledge to provide prior switching arrangements (e.g., West German Pat. Nos. 1,013,701 and 1,165,678) with two test relays per selector, of which a first rapidly responding test relay used to stop the selector turns on a second test relay (auxiliary test relay). The second test relay serves to ensure the prevention of double testing of two selectors in the parallel test.

West German Auslegeschrift No. 1,940,847 further discloses a technique for connecting seizing circuits to high impedance after their seizure. The same publication also discloses a technique for connecting inverse potentials not only from a testing and seizing selector but also within an equipment seized by a preceding selector over its own resistor to its own seizing circuit. This principle is realized, among other things, through the use of an opposing winding of the seizing relay. The opposing winding is substituted for the resistor mentioned earlier. This opposing winding is designed such that the seizing relay receives adequate holding current. Upon releasing the preceding selector, the current in the opposing winding is decreased so that the seizing relay is locked out by opposing energization. By switching the resistor or the opposing coil into circuit, the current in the test circuit of the blocking circuit is decreased, but not in the seizing circuit. The voltage at the check point of the equipment concerned is moved towards the reverse voltage. Hence, for high-speed selectors having highly sensitive test relays there usually exists for the insertion of the resistor or opposing coil a time condition that ensures that the test relays of the selectors can first respond safely before the current in the test circuit is decreased. To meet this time condition it is a common technique to employ auxiliary relays with response lags.

In all these known instances there is the danger of double testing within danger periods caused by the test and seizing procedures. The principle of using two test relays (test relay and auxiliary test relay) cannot be introduced belatedly in existing older automatic exchanges. Moreover, the danger of double testing is increased from the viewpoint of resistance tolerances and contact junction resistors in the test and seizing circuits.

Accordingly, an object of the invention is to provide means for ensuring the protection against double testing during the parallel testing of two selectors, whereby particularly, the parallel operation of selectors having test circuits of different structures must be taken into consideration. Likewise, danger periods of a double testing must be avoided.

SUMMARY OF THE INVENTION

In accordance with the invention, the foregoing and other objects are achieved in that the seizing circuit is fed by switching components for seizure over a self-regulating constant-current generator of known construction. The latter generator produces for the test or auxiliary test switching means a test current ratio for a single and for more than a single preceding and simultaneously testing switching component. This ratio, apart from possible differences between the internal impedance values of the test or the auxiliary test switching means, is inversely proportional to the number of preceding parallel-testing switching components.

The invention ensures that the level of the current flowing in the parallel test in one of the two test circuits of the divided test and seizing circuit differs more greatly from the level of the current flowing in the routine test than in conventional arrangements. In accordance with the invention, test relays which must evaluate the level of the test current flowing in the test circuit in order that the idle condition of a seizing circuit may be differentiated from the blocking state find more favorable conditions for such a differentiation between the two possible busy/idle conditions. Thus, the test and seizing conditions are generally more favorably designed and the protection against double testing is enhanced. These relationships play an important part in the construction of seizing circuits in switching devices having the task of interacting with the selectors of existing older automatic exchanges.

BRIEF DESCRIPTION OF THE DRAWING

The single FIGURE drawing is a schematic diagram showing the details of a preferred embodiment of the invention.

DETAILED DESCRIPTION OF THE PREFERRED EMBODIMENT

A test circuit of a selector W is shown with the two coils I and II of a test relay P. Coil II of the test relay may be short-circuited over a relay contact $1p$. The test circuit of selector W may be connected in a manner in itself known over a test switch wiper arm $c$ to check point PP of subsequent switching unit U, which is ready for seizure. This ready for seizure switching unit U may be a connector set. Connector sets are, for example, internal connector sets, outside repeaters, line termination circuits of long-distance trunks and the like. The ready for seizure switching unit U number among the "switching units needed for each connection", that is, units allocated individually to a connection throughout the duration thereof, such as selectors, interexchange trunks, links in switching networks, and the like.

A plurality of switching units U ready for seizure are combined into one group to which a common-connector-set control G, e.g., including a buffer store, as disclosed in West German Pat. No. 2,055,745 is allocated. Each of the switching units U is in communication with the common control G via both circuits $z1$ and $z2$. Each of the switching units U signals the circuit condition of the seizure to the common control G via circuit $z1$. The common control G signals via circuit $z2$ to each of the switching units the switching instruction "connect to high impedance" at least 40 milliseconds after seizure, of "block" against renewed seizure, if, that switching equipment U is in the idle condition and shall not be ready for seizure temporarily.

In the idle condition of the switching unit U a negative potential is applied across the base of transistor T3 from the common control G over series resistors not shown and over circuit $z2$ if switching unit U shall be ready for seizure. A 5-volt potential across resistor R1 is rendered inoperative by the negative potential applied from common control G. When switching unit U is ready for seizure in the idle condition, transistor T3 is permeable to current. Ground potential is applied over resistors R2 and R3 across the base of transistor T1 and the base of transistor T2. A comparatively weak quiescent current flows over the emitter-base junction of either transistor. Both transistors are thus prepared for the switching of a test and seizing circuit.

Transistor T4 is blocked in the idle condition of switching unit U by the negative potential applied from the common control G if switching unit U is ready for seizure. Transistor T5 is likewise blocked in this circuit condition by the 5-volt potential impressed on its base via resistors R4 and R5. Since an identical potential (60 V. negative potential) is applied to the base and emitter of transistor T6 in the quiescent condition, this transistor, too, is impermeable to current in the quiescent condition.

If in the course of a hunting action of selector W its test relay P is connected by test switch arm $c$ to check point PP of switching unit U, a test and seizing circuit is completed which runs along coils I and II of test relay P, resistors R6, R7 and R9 and along the parallel circuit of both transistors T1 and T2, still another resistor R8 being connected in series with transistor T2. The voltage drop across resistor R7 is recognized by a comparator V which exchanges an output signal in the form of +1V sent until then via its output $v$ against an output signal of −11V. In this way the seizure that came about is signalled to common control G via circuit $z1$. Comparator V reacts to the voltage drop across resistor R7 with a delay which is sufficiently large to ignore short noise pulses.

Due to the output signal of −11V sent from comparator V via its output, a current is likewise turned on by resistors R10, R5 and R4. This is a preparation for connecting transistor T5 with a view to making it permeable to current; this will be described hereinbelow.

Test relay P of selector W is energized in the test and seizing circuit running through check point PP. It closes its contact $1p$, threby shortcircuiting its higher-impedance coil II, and remains energized via its coil I. A relatively low impedance ground potential is now applied via contact $1p$ and coil I at check point PP of switching unit U. In this way, further selectors are prevented from testing in the idle condition for the seized switching unit already blocked due to the pickup of test relay P. The current rise (e.g., in resistor R7) caused further by the pickup of test relay P results in a rise of the voltage drop across resistor R7, but it does not affect comparator V.

About 40 milliseconds after comparator V has signalled via its output v and circuit z1 the input-side seizure of switching unit U to common control G, the latter disconnects the negative potential which until then has been turned on via circuit z2. The 5-volt positive potential coupled through resistor R1 blocks the transistor T3. Consequently, transistors T1 and T2, too, become non-conductive. However, the transistor T4 becomes conductive due to the 5-volt positive potential across resistor R1. It connects ground potential to the node between the two resistors R4 and R5. As a result, a negative partial potential appears at the node between the two resistors R5 and R10, and transistor T5 becomes conductive. In this way, the voltage divider formed by resistors R11 and R12 is energized, and at the voltage divider midpoint negative partial potential is generated. The latter partial potential renders transistor T6 conductive. The seizing circuit running initially through transistors T1 and T2 now no longer runs through them, but through resistors R13 and R14. Capacitors C1 and C2 provide that in the last-mentioned processes the transistors T1 and T2 become non-conductive with a given delay after the transistor T3, so that the above-described seizing current running through resistor R9 is not interrupted until the seizing and holding circuit has been switched through resistors R13 and R14 using transistor T6. Thus it is ensured that no interruption occurs in the test and seizing circuit that runs through check point P.

Due to this switchover of the test and seizing circuit running through check point PP from its line section running through transistors T1 and T2 to the line section running through transistor T6, the total resistance between check point PP and the negative voltage source is increased. Through this switching process (also called "connecting to high impedance") of the seizing circuit the blocking protection of switching unit U is increased, that is, the protection that no other selector may be tested for the seized and blocked seizing circuit of switching unit U.

Due to the above described switchover of the seizing circuit from its path through resistor R9 to the path through resistors R13 and R14, the voltage drop applied to comparator V is increased further. In this way, the test and seizing circuit is protected throughout the duration of the corresponding switched connection from induced or capacitively transmitted extraneous voltages. Moreover, the blocking protection against double testing is increased, and the current consumption decreased.

If the test and seizing circuit is opened from the preceding selector, that is, if the corresponding connection is released, the resistors R7 and R13 are without load. The voltage drop present until then is not required. The comparator V again disconnects the −11 volt signal sent until then via its output v and instead applies the +1V potential mentioned earlier. Thus, one signals via circuit z1 to the common control G that the switching unit U has been released from the preceding selector. The common control G now causes in a known manner, not described in detail, the release of all other parts of the switching unit U. The common control temporarily does not turn on the negative potential over circuit z2.

Due to the change of the output signal by comparator V from −11 volts to −1 volt, the transistor T5 is again non-conducting and, hence, also transistor T6. If a selector attempts to test the switching unit U, which is still in the circuit condition of the incompletely processed release, it will not meet with the −60 volt potential identifying the idle condition, i.e., neither through transistors T1 and T2 nor through transistor T6. The switching unit U is thus temporarily blocked against renewed seizure.

As described earlier, during the release, i.e., during the opening of the test and seizing circuit at its output v, the comparator V again turns on the positive potential of about 1 volt, instead of the negative potential of 11 volts. However, the comparator V reacts with a certain delay to the disappearance of the voltage drop across resistors R7 and R13. In this way, a false release cannot be caused, for example, by noise pulses which may be transmitted inductively or capacitively to the test and seizing circuit of a switched connection in the blocking state.

With regard to the problem of testing connections being released, there may be a case where a testing selector connects its test relay over its test switch arm to the check point of a switching unit seized and blocked by another selector. Immediately thereafter, this blocking selector connected until then to this switching unit and blocking it is released and opens the previously closed test and seizing circuit and being in the blocking state. In such a case, there is in conventional switching systems the possibility that the test relay of the testing selector in question picks up, thereby establishing a false connection. To prevent this from happening, the comparator V is equipped on the input side with switching means which are capable of detecting a lowering of the voltage drop across resistors R7 and R13. This may be switching means that differentiates the voltage according to time. In this connection it is worth noting that the initially existing test and seizing circuit in the blocking state contains only the coil I of the test relay of the blocking selector W concerned. However, this test and seizing circuit of the testing selector that continues to exist when the test and seizing circuit in the blocking state is opened likewise contains, in addition to the low-impedance coil I, the higher-impedance coil II of test relay P.

Thus, in this particular instance the release of the first connection does not appear through an opening of the test and seizing circuit, that is, not in a complete disappearance of the voltage drop across resistors R7 and R13. It is indicated by a decrease of the current, that is, in a lowering of the voltage drop across the two resistors mentioned above. The voltage drop effective after the current decrease in the comparator in this particular case occurs across resistors R7 and R13, which therefore is even greater than the voltage drop effective for the normal test and seizing process prior to the pickup of the test relay, because this voltage drop occurs only across resistor R7.

In order to be able to differentiate this particular instance (checking for releasing connection) from a normal test and seizing process using a switching unit in the idle condition, it is not sufficient for the comparator V to measure the voltage drop on the input side only. In order to be able to clearly distinguish these two instances from one another the comparator V is equipped on the input side with switching means by which the time functions of the input-side voltage, i.e., the lowering of the voltage drop across resistors R7 and R13, can be recognized. Thus, a test for releasing connections can be prevented with assurance even for selectors in which no special provisions have been made for preventing the test for releasing connections.

As mentioned earlier, the seizing circuit of switching unit U runs from check point PP through resistors R6, R7, R8 and R9 and through transistors T1 and T2. For the connection to higher impedance the portion of the seizing circuit comprising resistors R8 and R9 and transistors T1 and T2 are turned off, and instead, a holding circuit running through resistors R13 and R14 and through transistor T6 is turned on. Great importance is attached to the portion of the seizing circuit containing resistors R8 and R9 and transistors T1 and T2. This part of the seizing circuit works together with the connection to the −60V power source as a constant-current source. To this end, the transistor T1 has a current-regulating function. The potential applied to the base of transistor T1 across transistor T3 and resistor R2, and which is positive with respect to the −60V battery potential connected via resistor R9, is limited by Zener diode D1 such that the absolute value of the base potential of transistor T1 cannot exceed a value defined by the Zener diode D1. The current energizing the seizing circuit produces a voltage drop across resistor R9. The Zener voltage of diode D1 minus said voltage drop has a controlling influence on transistor T1 and determines its base current. Thus, since the base potential across the transistor T1 which is assumed to be conductive must be positive and remain so with respect to its emitter potential, the voltage drop in resistor R9 produced in the seizing circuit by the current may only be so large that the voltage drop can attain, at the very most, a voltage limiting value corresponding to the Zener voltage reduced by the control value required for transistor T1. Thus, since the voltage drop across resistor R9 is limited, the current in the seizing circuit itself is likewise subject to a limit that shall not be exceeded. Hence, transistor T1 has a current-regulating function. It simulates an adjustable resistance between zero ohm and infinity.

Resistor R8 is connected in parallel with transistor T1 by transistor T2 which in this operating condition is conductive. The control range of the constant-current supply formed by the transistors T1 and T2 and the resistors R8 and R9, as well as the diode D1 is determined by the resistance value of resistor R8. Thus, using the resistance simulated by transistor T1 the constant-current source is capable of regulating the current in the test and seizing circuit within the limits established by short-circuiting resistor R8 and by its full resistance value. Resistor R8 essentially serves to draw as far away as possible from the transistor T1 the power dissipation to be converted between resistors R7 and R9. It converts it in part and carries it outside of the transistor. In this way, the maximum power dissipation in transistor T1 in a practical application can be reduced to a ratio of about 2 to 1 relative to the case where resistor R8 and transistor T2 are absent.

However, it is also possible to eliminate transistor T2 and resistor R8. In this way one enlarges the control range of transistor T1, but at the same time, the power dissipation to be converted in transistor T1 is likewise increased.

The current-regulating action of the constant-current source will be described hereinbelow, whereby a comparison will be made between the routine test and the parallel test. Assuming that the two parallel-testing selectors are selectors with identical test circuits, then the parallel connection of both test circuits in the parallel test has, as is well known, half the internal resistance value when compared with the internal resistance of only one of the two test circuits. The constant-current source thus finds across point PP of the switching unit U in the parallel test only half the resistance as in the routine test. However, provisions are made that in both cases only the same current energizes the seizing circuit of the switching unit U. Hence, in a parallel test only half as much current flows in a test relay of a selector as in the routine test. For this reason, the parallel test is clearly discernible from the routine test of the test relays of the selectors concerned and this increases the protection against double testing.

In this connection it is also worth noting that the test and seizing circuits each run along one of the wires of a trunk line which may have different lengths and thus may produce a differently large additional line resistance in the relevant seizing circuit of a switching unit U. The line resistance of a trunk line must be visualized as inserted between resistor R6 of switching unit U and its check point PP. Another function of the constant-current source is to balance the line resistance of the seizing circuits concerned which vary from trunk line to trunk line.

Furthermore, the constant-current source affords good earth-fault protection at check point PP of switching unit U. Thus, if a short circuit occurs, the constant-current source prevents resistors R6 and R7 which carry the short-circuit current from being overloaded.

In addition to the function described hereinabove, i.e., to delay, upon the connection to high impedance, the disconnection of the branch of the seizing circuit extending through resistor R9, the capacitors C1 and C2 have the further task of providing for a delayed current rise in the test and seizing circuit at the start of a test and seizing process. As is well known, test relays require seizing relays in seizing circuits that are accessible to them and whose windings have a complex resistance that causes a delayed current rise at the start of each test and seizing process. To achieve the shortest possible response time of the test relay concerned the seizing relays normally carry a secondary winding which is short-circuited in the quiescent condition and this causes the current rise in a closed test and seizing circuit to take a steeper shape than if the short-circuited secondary winding were not provided. In this way, a comparatively short response time is achieved for the test relay. As is well known, motorswitch circuits employ test relays which in comparison to other electromechanical relays of known construction respond exceedingly rapidly. These test relays are thus particularly sensitive. They are so designed that they are capable of stopping the motor, although its response circuit runs along a winding of an electro-magnetic seizing relay in the seizing circuit of a rear-position switching unit ready for seizure, and although this seizing relay, despite its short-circuited secondary winding, results to a certain extent in a delayed current rise in the test and seizing circuit owing to the residual inductivity. If such highly sensitive and rapidly responding test relays of motor switches would test seizing circuits containing only pure resistances, the speed of response would be further increased thereby. One consequence would be contact bounces and increased wear of the contacts concerned, particularly, those that directly serve to stop the motor and, thus, are subject to a particularly heavy current load.

The foregoing undesired effect is eliminated by the switching arrangement designed in accordance with the principles of this invention in that at the start of each test and seizing process the current rise in transistor T1 is delayed by capacitor C1. In the idle condition there flows a quiescent current through transistor T3, resistor R2, the base-emitter junction of transistor T1 and resistor R9 if switching unit U is identified by common control G as ready for seizure. Resistor R2 is comparatively highly resistive in relation to resistor R9. Hence there is a relatively slight voltage drop across the resistor. Likewise, the voltage drop across the base-emitter junction of transistor T1 is very small. Hence, in the idle condition, capacitor C1 is charged up to about 1V only. Now, if a test and seizing circuit is completed, only a relatively weak current is initially generated owing to the above described current-regulating action of transistor T1 in the test and seizing circuit. Since, as mentioned earlier, the current flowing in the seizing circuit causes a corresponding voltage drop across resistor R9, and since this voltage drop at the very most may attain a lower value as compared wth the capacitor voltage by as much as the control voltage needed for the transistor T1, the voltage across capacitor C1 determines the maximum current in the seizing circuit. Capacitor C1 is now charged via resistor R2. The control potential across transistor T1 rises in accordance with this charging process. Consequently, also the current in the test and seizing circuit rises in concert. The charging process of capacitor C1 is terminated when the Zener voltage of diode D1 is attained. Thereafter, this voltage is maintained by the capacitor. From this instant on the current in the seizing circuit ceases to rise. Upon connection to high impedance, that is, when transistor T3 and resistor R2 are without load, capacitor C1 is discharged via resistor R15.

Just as an RC network for the delayed current rise in the emitter-collector junction and comprising the resistor R2 and the capacitor C1 is allocated to transistor T1, an RC network comprising the resistor R3 and the capacitor C2 is allocated to transistor T2. Both RC networks have substantially the same design. Since resistor R8 is connected in series with the emitter-collector junction of transistor T2, it is essentially the transistor T1 that determines the delayed current rise in the test and seizing circuit.

If switching unit U should be blocked in the quiescent condition against renewed seizure by a preceding selector, the common control G extracts the negative potential applied until then in the quiescent condition via circuit z2. This renders transistor T3 non-conductive. The base-emitter junctions of transistors T1 and T2 also become de-energized. As a result, no preceding selector can test the switching unit U which is blocked in the quiescent condition. Thus, switching unit U receives from common control G over one and the same circuit z2 both the signal "connection to high impedance" and the signal "blocking in quiescent condition". Both signals which the common control G sends in the same shape to switching unit U are discernible from one another, because the common control applies the negative voltage for the connection to high impedance after the seizure has taken place, while it applies the negative voltage for blocking the seizing circuit in the quiescent condition. However, both signals are transmitted to switching unit U over one and the same circuit z2.

In conclusion, with regard to the input-side switching means of the comparator V differentiating the voltage in accordance with the time in which switching means differentiating the voltage in accordance with the time are employed, reference is made to West German Pat. No. 1,165,677. Although this prior art switching arrangement relates to a test circuit, yet the switching means shown and described herein for differentiating the voltage in accordance with the time may also be employed in the switching arrangement described herein.

The preferred embodiment described hereinabove is considered to be only exemplary of the principles of the invention. It is contemplated that the described embodiment can be modified or changed in a number of ways known to those skilled in the art while remaining within the scope of the invention as defined by the appended claim.

We claim:

1. In a telecommunication switching system having a plurality of switching components, wherein each ready for seizure switching component indicates that readiness by applying an idle potential through a seizing circuit to a test point therein, the busy state being indicated by the absence of said idle potential, and including test switching means in switching components preceding the ready for seizure switching components for determining the busy-idle state of said ready for seizure switching components, said test switching means having an internal impedance established by connecting said test switching means to a said test point and thereby establishing a test and seizing circuit, and wherein an auxilary test switching means applies a blocking potential differing from said idle potential to a said test point for blocking the said switching component associated with the latter switch point, said auxiliary testing means having an internal impedance equal to that of said test switching means, the improvement comprising:

constant current source in each said ready for seizure switching component for supplying the said seizing circuit in the ready for seizure switching component a current of a value bringing about a test current ratio for one or more preceding switching components which is inversely proportional to the number of parallel-testing ones of said preceding switching components.

* * * * *